US010747790B2

(12) United States Patent
Sargent

(10) Patent No.: US 10,747,790 B2
(45) Date of Patent: Aug. 18, 2020

(54) TOPOGRAPHICAL CONTEXTUAL GROUPING

(71) Applicant: Ordnance Survey Limited, Southampton, Hampshire (GB)

(72) Inventor: Isabel Melanie Jane Sargent, Southampton (GB)

(73) Assignee: Ordnance Survey Limited, Southampton, Hampshire (GB)

( * ) Notice: Subject to any disclaimer, the term of this patent is extended or adjusted under 35 U.S.C. 154(b) by 43 days.

(21) Appl. No.: 16/012,892

(22) Filed: Jun. 20, 2018

(65) Prior Publication Data

US 2018/0373734 A1    Dec. 27, 2018

(30) Foreign Application Priority Data

Jun. 23, 2017    (EP) .................................... 17177740

(51) Int. Cl.
G06F 16/29 (2019.01)
G06F 16/487 (2019.01)
G06K 9/62 (2006.01)

(52) U.S. Cl.
CPC ............ *G06F 16/29* (2019.01); *G06F 16/487* (2019.01); *G06K 9/6232* (2013.01); *G06T 2215/16* (2013.01)

(58) Field of Classification Search
CPC ... G06F 16/29; G06K 9/6232; G06T 2215/00; G06T 2215/06; G06T 2215/08; G06T 2215/12; G06T 2215/16
See application file for complete search history.

(56) References Cited

U.S. PATENT DOCUMENTS

| 4,751,645 | A | * | 6/1988 | Abrams | .............. | G01S 15/8902 |
| | | | | | | 367/88 |
| 2002/0147572 | A1 | * | 10/2002 | Wallet | ...................... | G01V 1/30 |
| | | | | | | 703/2 |
| 2007/0130172 | A1 | * | 6/2007 | Lee | .......................... | G06F 16/29 |

(Continued)

OTHER PUBLICATIONS

Dec. 21, 2017—(EP) Extended Search Report—App 17177740.2.

(Continued)

*Primary Examiner* — Anne Marie Antonucci
*Assistant Examiner* — Andrew J Cromer
(74) *Attorney, Agent, or Firm* — Banner & Witcoff, Ltd.

(57) ABSTRACT

Aspects described herein provide a computer-implemented method and system for grouping topographic data based on the context of said data without the operator needing to make any assumptions. For each vector feature, its context, that is, information about the adjacent features, is incorporated in to the associated attribution data. In doing this, the system is able to characterise all of the vector features in a geographical area based on its context, from which patterns emerge. These patterns indicate features that have similar contexts, enabling the system to group the vector features according to their contexts based on their characteristics and attributes. Conversely, features that are anomalous within the region, that is, they do not fit the pattern of the surrounding features, are also identified. This is particularly important for identifying and resolving errors in the underlying topographic data.

17 Claims, 5 Drawing Sheets
(1 of 5 Drawing Sheet(s) Filed in Color)

(56) References Cited

U.S. PATENT DOCUMENTS

2008/0228775 A1    9/2008  Abhyanker et al.
2011/0044543 A1*   2/2011  Nakamura ......... G06K 9/00798
                                                                  382/190
2011/0280453 A1*  11/2011  Chen ........................ G06T 7/75
                                                                  382/113

OTHER PUBLICATIONS

Chesnaux, Romain et al., "A Simplified Geographical Information Systems (GIS)-Based Methodology for Modeling the Topography of Bedrock: Illustration Using the Canadian Shield," Applied Geomatics, Springer, DE, vol. 9, No. 1, Feb. 24, 2017, pp. 61-78.
Pantuwong, Natapon et al., "Interactive Topography Simulation Sandbox for Geography Learning Course," 8th International Conference on Information Technology and Electrical Engineering (ICITEE), IEEE, Oct. 5, 2016, pp. 1-4.

* cited by examiner

TOPOGRAPHICAL CONTEXTUAL GROUPING

FIELD

Aspects described herein relate to a computer implemented method and system for grouping topographic data based on its context. In particular, aspects relate to contextual grouping of topographic data so as to identify anomalies and determine new topographic data.

BACKGROUND

Most providers of digital maps rely on a very detailed topographical map database which stores the underlying data. For example, Ordnance Survey uses the very large scale topographic product OS MasterMap®, which records every feature larger than a few metres in one continuous dataset, and is constantly being updated.

A topographic feature is an abstraction of a real-world object. It is not the real-world object itself. For instance, the OS MasterMap® product is composed of discrete vector features, each of which has a feature type, geometry, and various feature attributes. More details about this product can be found in the manual *OS MasterMap® Topography layer—User guide and technical specification, v1.12—March 2014*.

The Topography Layer of the map database contains not only physically-apparent real-world objects, but also topographic concepts, such as inferred area feature boundaries. Currently, features within most topographic vector data (such as the data within the Topography Layer) exist in isolation with the only connection between features being the adjacency implied by coincident points (and lines) or the containment of some of the feature's points within an area or line feature. Each vector feature, whether area, line or point, has a location (which defines its shape in the case of areas and lines) and many other attributes.

There are many uses to which such data are put to derive more information about the region being described. For instance, to calculate the areas, lengths and distances between vector features. It is possible to automate such operations and such work has achieved estimates of, for example, the distance a delivery driver needs to walk to a front door or the extent of the land on which a built property exists.

However, whilst these applications are highly valuable, they do not provide opportunities for discovering new ways of categorising a feature or region because the rules-based approach is limited by the assumptions that the operator needs to make to devise the measurements to be made. Moreover, they do not provide opportunities for discovering errors in the underlying topographic data.

SUMMARY

Embodiments described herein address the above noted problems by providing a computer-implemented method and system for grouping topographic data based on the context of said data without the operator needing to make any assumptions. For each vector feature, its context, that is, information about the adjacent features, is incorporated in to the associated attribution data. In doing this, the system is able to characterise all of the vector features in a geographical area based on its context, from which patterns emerge. These patterns indicate features that have similar contexts, enabling the system to group the vector features according to their contexts based on their characteristics and attributes. Conversely, features that are anomalous within the region, that is, they have uncommon or rare combinations of context, characteristics and attributes, are also identified. This is particularly important for identifying and resolving errors in the underlying topographic data.

In doing this, different types of feature and region can be automatically discovered, labelled and added in to the attribution data. For example, regions of buildings that have the same characteristic context of land and roads may be interpreted as a particular era of housing estate. This is achieved without having to design specific rules for finding defined types of feature or region, and therefore unusual features and regions may also be identified. Furthermore, by identifying anomalous data, the existing attribution data can be improved.

A first aspect described herein provides a computer implemented method of identifying anomalies in a topographic dataset, the method comprising obtaining topographic data relating to a geographic area, the topographic data comprising a plurality of features having one or more attributes associated therewith, generating adjacency data for the plurality of features, wherein the adjacency data of a feature comprises information relating to at least one attribute associated with at least one spatially adjacent feature, identifying at least one group of features in dependence on the adjacency data, and identifying one or more anomalous features having adjacency data different from the adjacency data of the at least one group.

For each feature in the topographic dataset, the attributes of the spatially adjacent features are used to generate adjacency data for that feature. The features can then be grouped together based on the adjacency data. Specifically, features having the same or similar adjacency data will be grouped together. Features that do not fit into those groups, that is, features having different adjacency data to any other feature, may then be identified as anomalies.

The identifying at least one group may comprise encoding the adjacency data of a feature based on the attributes associated with the at least one spatially adjacent feature. For example, the adjacency data may be encoded to provide a point location in an n-dimensional attribute space defined by the number, n, of attributes associated with the plurality of features.

The identifying at least one group may then comprise grouping features based at least in part on the similarity of the encoded adjacency data, wherein features having encoded adjacency data above a predefined level of similarity are grouped together. For example, features that have at least 65% of their attributes in common may be grouped together. As another example, features that have a distance in attribute space of three or less attributes between them may be grouped together.

Identifying one or more anomalous features based at least in part on the encoded adjacency data, wherein features having encoded adjacency data below a predefined level of similarity to at least one group are identified as anomalous. For example, features that have below 65% of their attributes in common with the at least one group may be identified as anomalous. As another example, features that have a distance in attribute space of four or more attributes between them and the at least one group may be identified as anomalous.

The predefined level of similarity may be dependent on a number of various factors such as the number of attributes used to group the features, as well as the context and application in which the method is to be used.

The identifying at least one group may further comprise clustering the encoded adjacency data. For example, the encoded adjacency data may be clustered using k-mean techniques.

In such cases, the identifying one or more anomalous features may comprise identifying one or more features at a predefined distance from the at least one group identified from the clustered adjacency data.

In another embodiment, the identifying at least one group may further comprise frequent sub-graph mining of the encoded adjacency data.

In some arrangements, the attributes may comprise one or more of: type, size, shape and manifestation. An example of a type of feature may include whether the feature relates to land, a building, water or the like. The size may be area covered by the feature. The manifestation of a feature may be whether it is man-made or naturally occurring. Alternatively, the attributes may comprise any characteristic that can be used to describe a feature.

The method may further comprise determining at least one new attribute based on the at least one group, and assigning the at least one new attribute to the features of the at least one group, thus providing updated and improved topographic data.

The method may further comprise identifying an error in the topographic data based on the one or more anomalous features, and modifying the topographic data to correct the identified error.

The method may further comprise determining at least one new attribute based on the one or more anomalous features, and assigning the at least one new attribute to the one or more anomalous features.

In some arrangements, the adjacency data of the plurality of features may further comprise information relating to at least one attribute associated with a feature that is spatially adjacent to the at least one spatially adjacent feature.

The method may further comprise generating a map image comprising a visual representation of the at least one group and/or one or more anomalous features.

A second aspect described herein provides a computer implemented method of improving a topographic dataset, the method comprising obtaining topographic data relating to a geographic area, the topographic data comprising a plurality of features having one or more attributes associated therewith, generating adjacency data for each of the plurality of features, wherein the adjacency data of a feature comprises information relating to at least one attribute associated with at least one spatially adjacent feature, identifying at least one group of features in dependence on the adjacency data, determining at least one new attribute based on the at least one group, and assigning the at least one new attribute to the features of the at least one group.

A third aspect described herein provides a computer implemented method of identifying anomalies in a topographic dataset, wherein the topographic data comprises a plurality of features having one or more characteristics associated therewith, the method comprising assigning the characteristics of an adjacent feature to the plurality of features, grouping one or more of the plurality of features based on the assigned characteristics, wherein features having a set of assigned characteristics in common are grouped together, and identifying anomalous features having a set of assigned characteristics different from the grouped features.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Further features and advantages described herein will become apparent from the following description of embodiments thereof, presented by way of example only, and by reference to the drawings, wherein.

DETAILED DESCRIPTION

Geospatial vector data comprises areal, line and point features that denote real-world objects and characteristics such as buildings, roads, paths, rivers, regions of vegetation and the like. As well as the location information, many vector features will have attribution giving information about the real-world object that they represent, as well as metadata such as how and when the data was obtained. Considering, for example, just the areal features, information is available in the values given to the Theme, Descriptive Group, Descriptive Term and Make fields. These fields act to categorise the objects in various ways such as type (for example, building, land, water or the like), how they manifest (for example, an overhead structure) or whether the object is man-made or naturally occurring.

Figure 1:
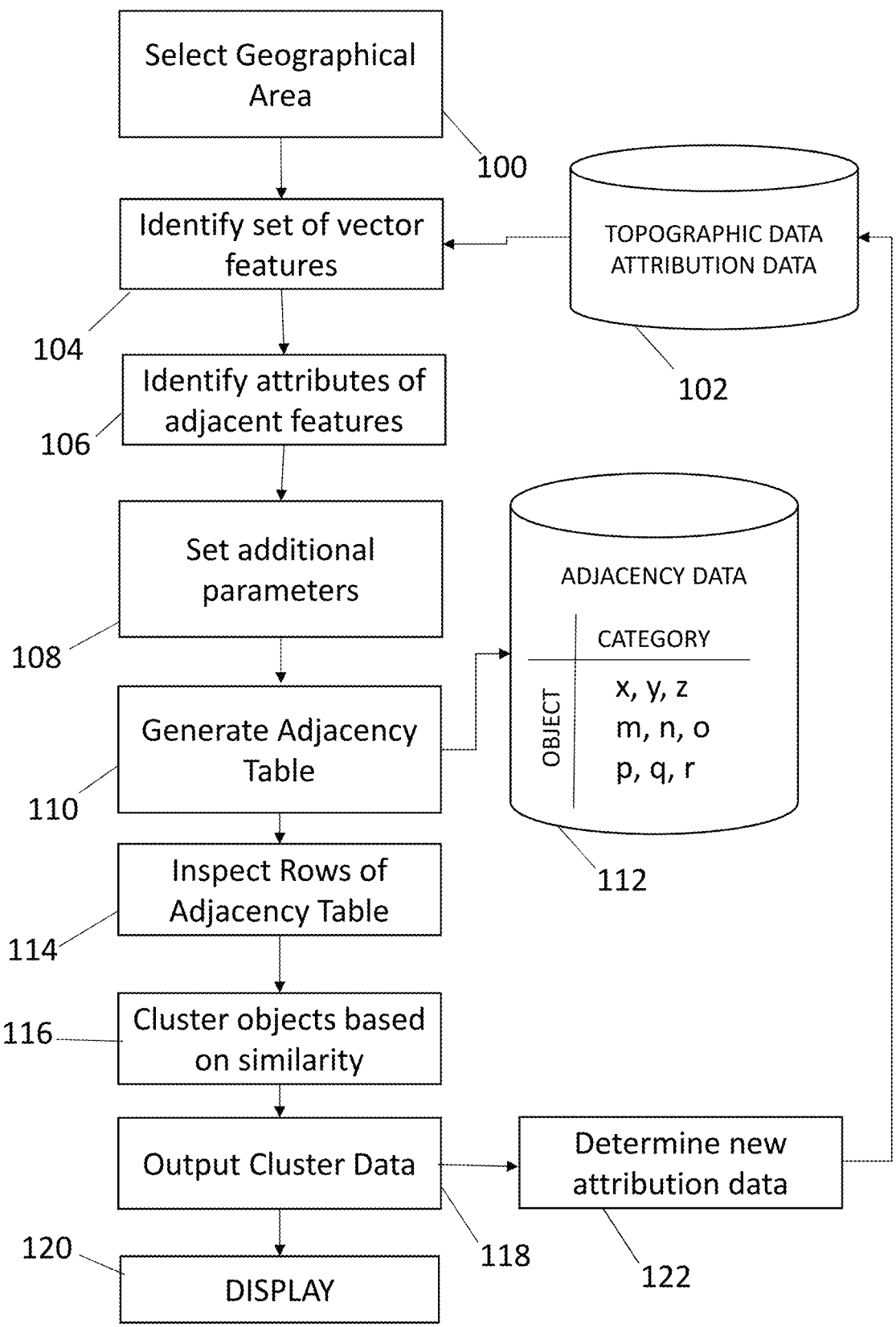
FIG. 1 is a flow diagram illustrating aspects described herein.

Grouping of these vector features can be performed based on the characteristics of the vector features surrounding them, that is, their context. FIG. 1 shows a method of clustering to automatically group vector features based on the characteristics of adjacent features using the existing topographic and attribution data 102.

First of all, a particular geographic area (step 100) to be inspected is specified. The geographical area may be of any size or shape required by the user. For example, the user may be the digital map provider looking to cluster features in a 10 km² area of land, or to cluster features across the whole of a country. Using the existing topographical and attribution data 102, each of the vector features within the geographical region are identified (step 104) and their associated attributes (step 106).

To begin the clustering, the user may also set some further parameters (step 108) such as the number of attributes the clustering is to be based on, or the specific type of attributes that are to be looked at. For example, the user may want to cluster the vector features based on three specific attributes taken from the Theme field, the attributes being "Buildings", "Land" and "Road, Tracks and Paths". As such, for each vector feature in the selected geographical area, the clustering will look at the adjacent features to see which of those three attributes they have.

Alternatively, the clustering may be automatically based on all of the attributes associated with the various vector features in the geographic area, rather than being limited to a set number of attributes. Therefore, instead of looking for specific attributes, the system will look for any attribute that is associated with the adjacent features of each vector feature, or even any attribute that is stored in topographic and attribution data 102.

For each vector feature, the attributes of the adjacent features are then used to generate an adjacency table (step 110). Using the example given above, one of the vector features may be adjacent to two features that are "Buildings", two features that are "Land", and zero features that are "Road, Tracks and Path". In the generated adjacency table 112, attributes of adjacent features, such as their number, area or shape characteristics, in each of the attribute categories is recorded for each vector feature. As such, each row relates to a particular object represented by a vector feature, and each column relates to an attribute that the adjacent features may have. In this respect, there will be a row for every vector feature in the geographic area and a column for every attribute that has either been identified within the geographic area or pre-selected by the user.

The rows of the adjacency table 112 are then inspected (step 114) and used to encode the adjacency data of each vector feature based, for example, on the type of attribute and the number of adjacent features with those attributes. Those features with very similar encodings can then be clustered together (step 116) and output as cluster data (step 118). Simple clustering techniques, such as k-means, can be applied to automatically cluster the vector features based on the encoded adjacency data, from which different 'types' of vector feature can be found and new attribution data derived (step 122). The new attribution data includes the adjacency data itself, as well as any new ways of classifying the vector features that could be derived from the cluster data, and any corrections to the attribution data 102 resulting from any errors that may have been identified from the encoded adjacency data, as will be described in more detail below. Again using the above scenario, a basic example of new attribution data that could be derived from this adjacency data may be to categorise the vector feature as having four boundaries (two adjacent to "Buildings", two adjacent to "Land").

The general principle is that rows which have the same values in each of the attribute columns will be considered similar. Consequently, it follows that the more attributes on which the clustering is based, the more meaningful the clustering, primarily because there are more attributes to compare each of the vector features with. In this respect, the vector features can be thought to have a point location in an n-dimensional space defined by the adjacency attributes, n being the number of attributes on which the clustering is based. In this space, clusters can be identified where vector features are found to be near to each other. The bigger n is, the more detailed the quantitative description of each vector feature is, which thus increase the precision in the similarity between features having the same point location in the attribute space. For example, vector features with ten attribute columns in common can be considered the same "type" of feature with more confidence than vector features having only two attribute columns in common. Therefore, the encoding may also take into account the number of attribute categories considered, as well as the values of the adjacency table 112.

The cluster data also may be output to a display for visual representation (step 120), for example, by outputting a digital map of the geographical area in which features with similar encodings are colour coded.

Any new attribution data can be added to the existing attribution data 102 to enrich the data associated with each vector feature. This additional classification of features can then be applied to higher level analysis such as identifying distinct regions such as housing estates or for predicting characteristics such as building age and construction type from data that has been obtained for a subset of buildings with the same adjacency encoding. Additionally, the enriched attribution data be used to run the clustering again to see if the vector features can be grouped further.

Aside from grouping similar vector features and identifying new "types" of attribute therefrom, the encoded adjacency data is also indicative of any anomalous data that is not similar to any other vector feature within the area. That is, features having unique encoded adjacency data could indicate that the feature is unique within the specific area, or that there is an error in the raw topographic data in the underlying map database. Specifically, it could indicate an error in the attribution data 102 of one or more of the adjacent features.

To determine whether an error exists, diagnostics can be run to determine how the adjacency data differs to other features in the geographic area and then determine whether this difference is due to erroneous attribution data 102. For example, erroneous data may be detected by identifying vector features that are far away from a cluster centre in the n-dimensional attribute space. The adjacency data of the nearest neighbouring vector features in the attribute space may then be compared to the adjacency data of the outlier to identify the differences in the adjacency data and determine whether these differences indicate erroneous or anomalous data. In this respect, a series of rules may be implemented for distinguishing between an error in the adjacency data and an anomalous vector feature. For example, the rules may require that vector features that differ from their nearest neighbouring vector features by a number of different attributes above a pre-determined threshold are anomalous, for example, 5 or more different attributes, whereas erroneous vector features are those that are similar to their nearest neighbour in all but one or two attributes. It will be appreciated however that any form of suitable analysis may be implemented in order to determine whether the anomalous vector feature has been caused by erroneous attribution data 102.

If the vector feature is erroneous, the difference in the adjacency data can be used to identify which adjacent features are causing the difference. The attribution data 102 of the adjacent feature(s) causing the error can then be corrected.

As another example, the adjacency data of the vector feature may be compared to the adjacency data of the immediately adjacent features in the geographic space to identify where the difference exists, that is, which adjacent features and which attributes are causing the difference. Once the difference in adjacency data has been attributed to one or more of the adjacent features, the attribution data 102 of those adjacent vector feature can be cross checked with the attribution data 102 of any vector features with which it has been clustered, that is, vector features that have been identified as the same "type" of vector feature, to determine whether this attribution data 102 is incorrect or not. If it is incorrect (that is, it is different from the other members of that cluster), the attribution data 102 can be corrected based on that of the other vector features in the same cluster. If, however, it is correct (that is, it matches the other members of the cluster), then the anomalous feature is simply unique to the area.

As such, it is possible to compare the adjacency data of the vector features in both the attribute and geographic space. The clustering method illustrated by FIG. 1 can therefore be used as an effective and reliable tool for testing the quality of the topographical and attribution data 102, and then correcting any errors.

Where an anomalous feature is found to be a unique vector feature not caused by erroneous attribution data 102, a new "type" of vector feature may be derived therefrom and used to generate new attribution data.

Figure 2:
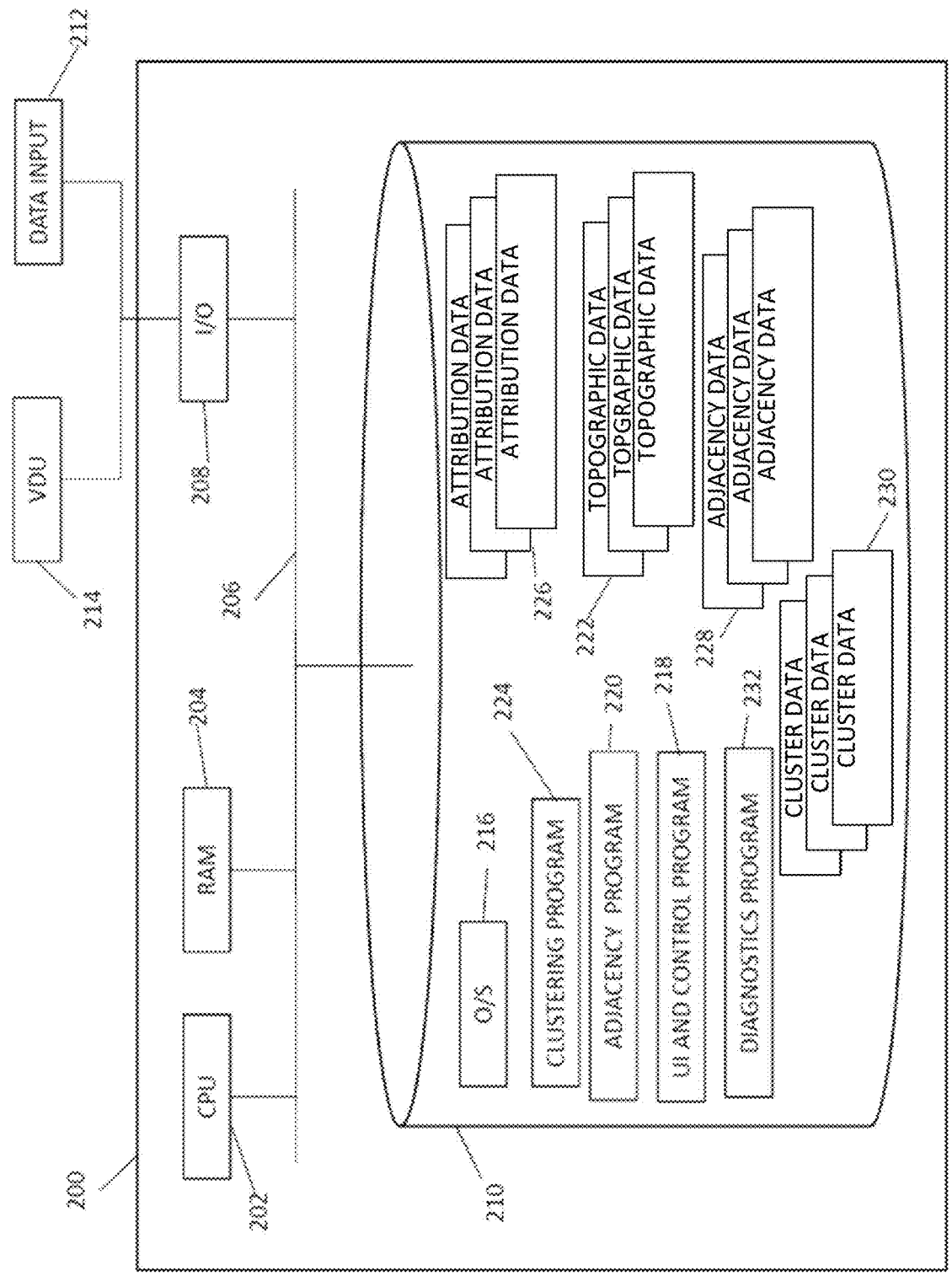
FIG. 2 is a block diagram illustrating a computer system on which one or more aspects described herein may be implemented.

FIG. 2 illustrates an example of a general computer system 200 that may form the platform for one or more illustrative embodiments described herein. The computer system 200 comprises a central processing unit (CPU) 202 and a working memory 204, connected by a common bus 206, and having an input-output (I/O) interface 208 arranged to receive control inputs from a user via a device connected to a data input port 212 such as a keyboard, mouse, or other controller, and provide output information via a user interface which is displayed on an device having a visual display unit 214 such as a computer screen, television, mobile device or any other device capable of providing a visual display.

The computer system 200 is also provided with a computer readable storage medium 210 such as a hard disk drive (HDD), flash drive, solid state drive, or any other form of general-purpose data storage, upon which various programs are arranged to control the computer system 200 to operate in accordance with embodiments described herein. For example, stored on the computer readable storage medium 210 is an operating system program 216 that when run by the CPU 202 allows the system to operate. Also provided is an adjacency program 220, a clustering program 224 and a diagnostics program 232 which together may implement the contextual clustering when run by the CPU 202, as will be described in more detail below. In order to interface with and control the adjacency program 220, clustering program 224 and diagnostics program 232, a user interface and control program 218 is also provided, that controls the computer 200 to provide a visual output to the VDU 214, and to receive user inputs via a keyboard, or another peripheral such as a mouse connected to the data input port 212, in order to control the adjacency program 220, clustering program 224 and diagnostics program 232.

Input data upon which the adjacency program 220 operates includes data input to the computer system 200 received via the data input port 212. Such data may include the instructions identifying a particular geographic area, and any other instructions regarding the parameters on which the clustering is to be based upon. Additionally, topographic data 222 relating to the same geographical area, such data being made up of a plurality of vector features that represent real world objects, and the attribution data 224 corresponding to each of the vector features making up the topographic data 222. As described previously, the attribution data 224 provides information relating to the specific characteristics of the vector features such as the type of object to which they relate, for example, whether the feature is a building or land. Where the feature is a building, the attribution data 224 may include what type of building it is, how big the building is, how old the building is, and other such information. Similarly, where the feature is land, the attribution data 224 may include what type of land it is, how big the land is, what the land is used for, and the like. The adjacency program 220 generates adjacency data 228 including the adjacency table described above. As such, the adjacency data 228 for each vector feature in a particular geographic area, comprises information regarding the adjacent vector features. As described above, the adjacency data 228 can be added to the attribution data 226 for each vector feature for various purposes including, for example, for future clustering. The adjacency data 228 is then be input to the clustering program 224 to generate the cluster data 230, which can then be output via the VDU 214. The cluster data 230 includes information regarding any patterns or anomalies in the vector features of the specified geographical area. The cluster data 230 will also include information regarding any new types of attribution data 228 that may have been derived from the clustering, which can then also be added to the attribution data 226 stored in the computer readable storage medium 210.

Where anomalous vector features are identified, the diagnostics program 232 is arranged to identify if this is due to an error in the attribution data 226 of an adjacent feature, and if so, what that error is. If an error is identified, the diagnostics program 232 will correct the erroneous attribution data 226 stored in the computer readable storage medium 210.

Figure 3:
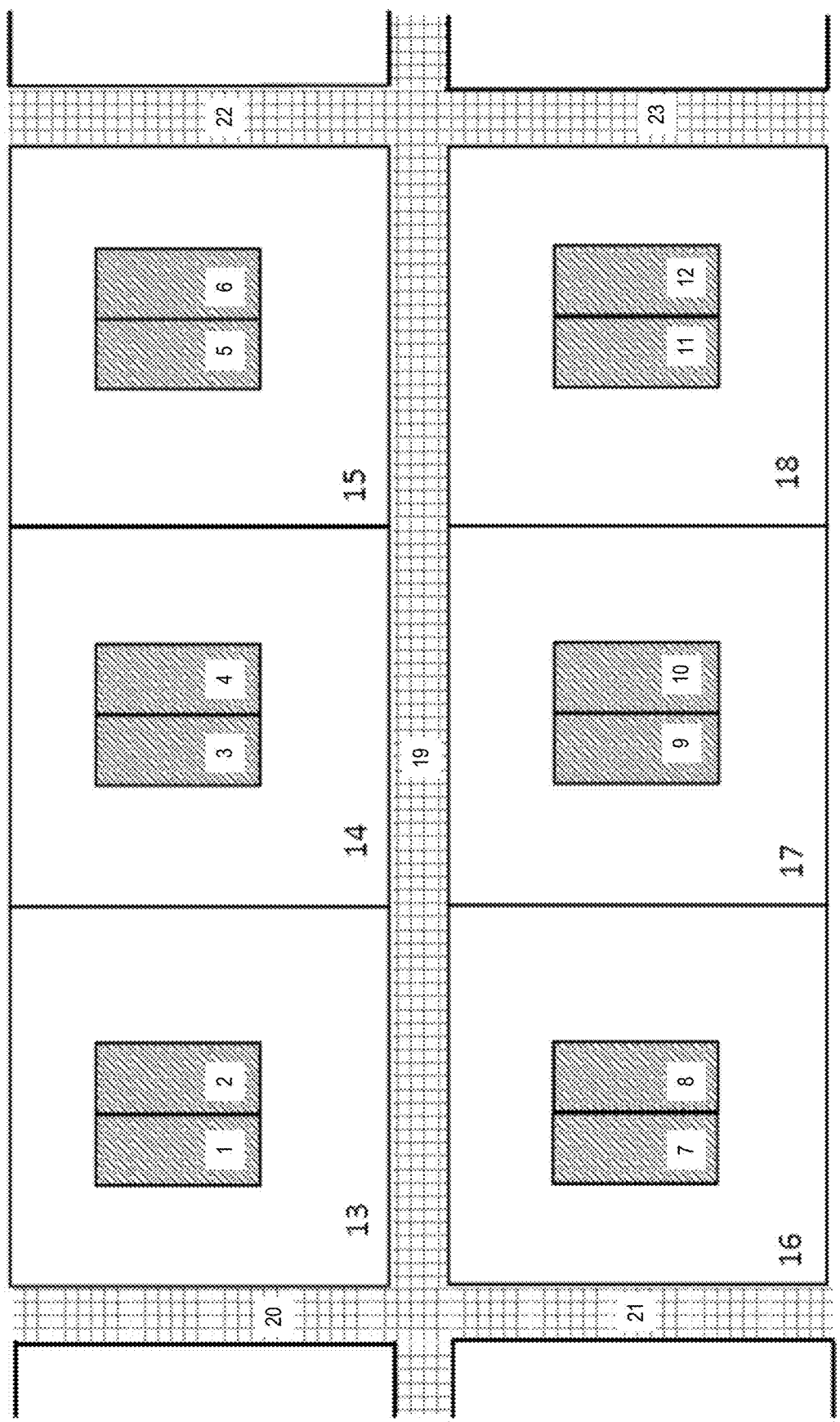
FIG. 3 is a diagram illustrating an example of one or more aspects described herein in use.

An example of how various aspects are implemented will now be described with reference to FIG. 3. Consider a geographical region containing twenty one vector features (labelled 1 to 21), wherein twelve of those features represent a "Building" (features 1-12) having an area of 75 m$^2$, six represent "Land" (features 13-18) having an area of 200 m$^2$, and three represent "Road, Track or Path" (features 19-23), feature 19 having an area of 500 m$^2$ and features 20-23 having an area of 100 m$^2$. For each vector feature, the attribution data of the adjacent vector feature is identified and used to generate an adjacency table such as that shown in Table 1 below.

TABLE 1

| Vector Feature | Count of Building | Count of Land | Count of Road, Track or Path | Area of Adjacent Building (m$^2$) | Area of Adjacent Land (m$^2$) | Area of Adjacent R/T/P (m$^2$) |
|---|---|---|---|---|---|---|
| 1 | 1 | 1 | 0 | 75 | 200 | 0 |
| 2 | 1 | 1 | 0 | 75 | 200 | 0 |
| 3 | 1 | 1 | 0 | 75 | 200 | 0 |
| 4 | 1 | 1 | 0 | 75 | 200 | 0 |
| 5 | 1 | 1 | 0 | 75 | 200 | 0 |
| 6 | 1 | 1 | 0 | 75 | 200 | 0 |
| 7 | 1 | 1 | 0 | 75 | 200 | 0 |
| 8 | 1 | 1 | 0 | 75 | 200 | 0 |
| 9 | 1 | 1 | 0 | 75 | 200 | 0 |
| 10 | 1 | 1 | 0 | 75 | 200 | 0 |
| 11 | 1 | 1 | 0 | 75 | 200 | 0 |
| 12 | 1 | 1 | 0 | 75 | 200 | 0 |
| 13 | 2 | 1 | 2 | 150 | 200 | 600 |

TABLE 1-continued

| Vector Feature | Count of Building | Count of Land | Count of Road, Track or Path | Area of Adjacent Building ($m^2$) | Area of Adjacent Land ($m^2$) | Area of Adjacent R/T/P ($m^2$) |
|---|---|---|---|---|---|---|
| 14 | 2 | 2 | 1 | 150 | 400 | 500 |
| 15 | 2 | 1 | 2 | 150 | 200 | 600 |
| 16 | 2 | 1 | 2 | 150 | 200 | 600 |
| 17 | 2 | 2 | 1 | 150 | 400 | 500 |
| 18 | 2 | 1 | 2 | 150 | 200 | 600 |
| 19 | 0 | 10 | 4 | 0 | 2000 | 400 |
| 20 | 0 | 2 | 1 | 0 | 400 | 500 |
| 21 | 0 | 2 | 1 | 0 | 400 | 500 |
| 22 | 0 | 2 | 1 | 0 | 400 | 500 |
| 23 | 0 | 2 | 1 | 0 | 400 | 500 |

The adjacency table may include ordinal data that counts the number of adjacent features having a certain attribute, as illustrated by columns 2 to 4 in Table 1, as well as continuous data such as the area of a given type, as illustrated by columns 5 to 7 in Table 1.

Whilst Table 1 provides a very basic example of an adjacency table, it can still be seen that patterns of similarity start to emerge. For example, features 1 to 12 all have the same adjacency profile, and so can be grouped as being the same type of object. Similarly, features 13, 15, 16 and 18 can be grouped as the same type of feature, as can features 14 and 17, and features 20 to 23. Say, for example, that a geographical area had several portions of land with the same vector feature configuration as FIG. 3, Table 1 could be extrapolated over this geographical area and the vector features grouped by type according to the results of this table. From these groupings, new information can be derived. For example, features 1 to 12 may be newly categorised as rows of semi-detached houses that make up a housing estate, wherein each row comprises 3 pairs of houses and is separated by a grid network of roads.

It will be appreciated that Table 1 above provides one way of recording the adjacency data, and that a number of various other methods may be implemented, for example, by storing the data in a graph or as triples. Such methods allow the adjacency data to be encoded directly without needing to first generate an adjacency table. Where the adjacency data is stored as a graph, our techniques may be implemented in order to group the vector features based on the similarity of their adjacency data. For example, frequent sub-graph mining techniques may be implemented in order to group the vector features, which can then be used to identify anomalous data and/or new attribution data, as described above.

Figure 4:
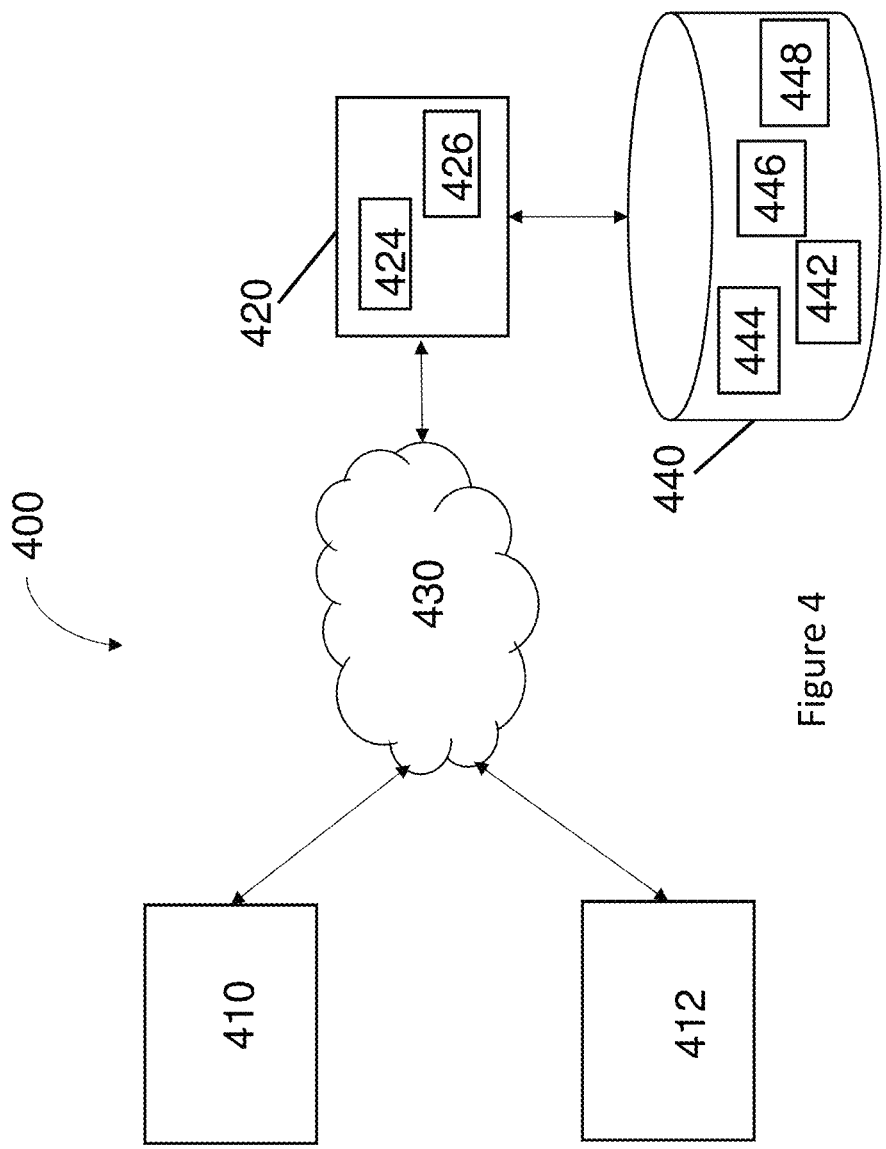
FIG. 4 is a block diagram illustrating an example system in which one or more aspects described herein may be implemented.
Figure 5:
FIG. 5 is an example illustrating an output of one or more aspects described herein.

FIG. 4 illustrates one example of aspects described herein in use. Generally, the system described below implements the method described in detail above, and reference should be made to the above when considering the various steps and processes described below.

FIG. 4 shows a system 400 comprising a server 420 in communication with third party servers 410, 412 via a network 430 through a communications interface 424. The server 420 comprises a processor 426 arranged to carry out computing operations, and is also in communication with a core server 440. The core server 440 runs different software implemented modules which carry out different tasks or provide particular data when required by the processor 426. More specifically, a topographic data module 442 contains the topographic vector features and the associated attribution data. An adjacency module 444 is arranged to carry out the necessary steps to generate adjacency data for the topographic vector features, as described above. Once the adjacency data has been generated, a clustering module 446 is arranged to generate cluster data, including any new attribution data derived from said cluster data and information relating to anomalous vector features that have been identified by the clustering. A diagnostics program 448 is also provided for determining whether any anomalous vector features are due to incorrect attribution data.

The server 420 is arranged to receive clustering instructions via network 430 from the third party servers 410, 412 (for example, the server on which the user's device is running), from which the particular geographical area on which the clustering is to be based is extracted for input to the adjacency module 444. These instructions may also include any specific attributes on which the clustering is to be based. The received clustering instructions are communicated to the core server 440, which extracts the relevant parts of the topographic vector features and attribution data from the topographic data module 442.

The adjacency module 444 is then arranged to carry out the adjacency calculation methods described above based on the data extracted from the topographic data module 442 to thereby determine adjacency data for each of the topographic vector features within the specified geographical area. The clustering module 446 uses the adjacency data to generate cluster data, as described above. The resulting cluster data is then communicated to the server 420 where is may be used to generate a visual representation of the clustering, identify any new attribution data for each of the vector features and identify any anomalous vector features. This information can then be distributed to the third party servers 410, 412 and displayed to the user on a visual display (not shown). As described above, any new attribution data identified can be added to the existing topographic data. Furthermore, where an anomalous vector feature is identified, the error in this data can be rectified, for example, by using the attribution data of adjacent vector features.

An example of the system 400 of FIG. 4 in use will now be described. The server 420 may first receive instructions from a third party server 410 via network 430. The third party server 410 may be that of a borough council seeking information about the buildings within the borough. As described previously, the instructions may specify which attributes the clustering is to be based on. The received clustering instructions will then be communicated to the core server 440, which extracts the relevant parts of the topographic vector features and attribution data for that borough from the topographic data module 442. The adjacency module 444 will then run the adjacency calculating methods based on the extracted data to thereby determine adjacency data for each of the topographic vector features within the borough. The clustering module 446 will then cluster the vector features based on this adjacency data to generate cluster data that is communicated to the server 420. The server 420 will generate a visual representation of the cluster data for distribution to the third party server 410.

As described previously, the cluster data can be used to infer new attribution data, detect erroneous attribution data and identify anomalous vector features. In the present example, the cluster data may show a particular regions of housing, from which it may be possible to characterise the different regions by the era in which they were built and infer the energy efficiency of those buildings. From the cluster data, it may be possible to infer that particular types of property of a certain age all have similar energy efficiency ratings, for example, that semi-detached houses built in the 1930s all have a C grade rating.

The council may then use this clustering to identify particular types of building with low energy efficiency ratings. By identifying a correlation between building type and energy efficiency rating, solutions for improving the energy efficiency rating can be tailored to that building type.

As described previously, any anomalous outliers identified by the clustering are also identified and used to diagnose a problem, either with the data or the building itself. For example, amongst the semi-detached houses built in the 1930s, there may be one outlier having a significantly lower energy efficiency rating. This could be due to the energy efficiency rating having been measured or recorded incorrectly, or it could be that the rating is correct and that there is something wrong with the property that needs to be urgently addressed. In this respect, where an anomalous feature is identified, the diagnostic program 448 will be determine if and where an error has occurred, and will communicate the results of this diagnosis back to the server 420. If an error has occurred, the diagnostics program 448 will send information relating to the correct attribution data which can be used when generating the visual representation of the cluster data. If an error has not occurred, the diagnostics program 448 will communicate this to the server 420, confirming that the anomalous feature is not caused by incorrect attribution data.

In the above example, it will be appreciated that the clustering may be run based on the data already stored in the topographical data module 442, or it may be based on further data provided by the third party requesting the cluster data. For example, energy efficiency data may be provided by the borough council or it may already be stored in the topographic data module 442.

The above is just one example of an application in which the clustering may be used, and it will be appreciated that such a system may be used for numerous purposes, such as valuation and insurance. For example, by clustering the buildings in a particular area, an estate agent may be able to compare the costs of similar buildings in order to value a property that is to be put on the market. Such a clustering may be based on age, size, structure type, number of bedrooms, land size, distance to the nearest school, as well as various other attributes. In the above described arrangements, the attributes of features that are immediately adjacent are used to cluster the vector features. As a second level, the adjacency table described above may be generated on the basis of adjacent features, and the adjacency of those adjacent features. For example, consider vector feature 1 in FIG. 3, the system would identify the attributes of the features adjacent to feature 1 (i.e. features 2 and 13), and the attributes of the features adjacent to feature 2 (i.e. features 1 and 13) and feature 13 (i.e. features 1, 2, 14, 19 and 20). This adds another layer to the adjacency data which can be used to refine the resulting cluster data.

Various modifications, whether by way of addition, deletion and/or substitution, may be made to all of the above described embodiments to provide further embodiments, any and/or all of which are intended to be encompassed by the appended claims.

The invention claimed is:

1. A computer implemented method comprising:
   obtaining topographic data relating to a geographic area, the topographic data comprising a plurality of features having one or more attributes associated therewith;
   generating adjacency data for the plurality of features, wherein the adjacency data of a feature comprises information relating to at least one attribute associated with at least one spatially adjacent feature;
   identifying at least one group of features in dependence on the adjacency data, wherein the adjacency data of a feature is encoded based on the attributes associated with the at least one spatially adjacent feature; and
   identifying one or more anomalous features having adjacency data different from the adjacency data of the at least one group based at least in part on the encoded adjacency data, wherein features having encoded adjacency data below a predefined level of similarity to the at least one group are identified as anomalous.

2. A method according to claim 1, wherein the identifying at least one group comprises grouping features based at least in part on the similarity of the encoded adjacency data, wherein features having encoded adjacency data above a predefined level of similarity are grouped together.

3. A method according to claim 1, wherein the encoding the adjacency data comprises generating a point location in an n-dimensional attribute space defined by a number, n, of attributes associated with the plurality of features.

4. A method according to claim 1, wherein the identifying at least one group further comprises clustering the encoded adjacency data.

5. A method according to claim 4, wherein identifying one or more anomalous features comprises identifying one or more features at a predefined distance from the at least one group identified from the clustered adjacency data.

6. A method according to claim 1, wherein the one or more attributes comprise one or more of: type, size, shape, characteristic and manifestation.

7. A method according to claim 1, further comprising:
   determining at least one new attribute based on the at least one group; and
   assigning the at least one new attribute to the features of the at least one group.

8. A method according to claim 1, further comprising:
   identifying an error in the topographic data based on the one or more anomalous features; and
   modifying the topographic data to correct the identified error.

9. A method according to claim 1, further comprising:
   determining at least one new attribute based on the one or more anomalous features; and
   assigning the at least one new attribute to the one or more anomalous features.

10. A method according to claim 1, wherein the adjacency data of the plurality of features further comprises information relating to at least one attribute associated with a feature that is spatially adjacent to the at least one spatially adjacent feature.

11. A method according to claim 1, further comprising:
generating a map image comprising a visual representation of the at least one group and/or one or more anomalous features.

12. A system comprising:
a processor; and
a computer readable medium storing one or more instruction(s) arranged such that when executed the processor is caused to:
    obtain topographic data relating to a geographic area, the topographic data comprising a plurality of features having one or more attributes associated therewith;
    generate adjacency data for the plurality of features, wherein the adjacency data of a feature comprises information relating to at least one attribute associated with at least one spatially adjacent feature;
    identify at least one group of features in dependence on the adjacency data wherein the adjacency data of a feature is encoded based on the attributes associated with the at least one spatially adjacent feature; and
    identify one or more anomalous features having adjacency data different from the adjacency data of the at least one group based at least in part on the encoded adjacency data, wherein features having encoded adjacency data below a predefined level of similarity to the at least one group are identified as anomalous.

13. A system according to claim 12, wherein the processor is further caused to generate a map image comprising a visual representation of the at least one group and/or one or more anomalous features.

14. A system according to claim 13, wherein the processor is caused to output the map image to a display device.

15. A system according to claim 12, wherein the processor is further caused to:
    identify an error in the topographic data based on the one or more anomalous features; and
    modify the topographic data to correct the identified error.

16. A computer implemented method of identifying anomalies in a topographic dataset, the method comprising:
    obtaining topographic data relating to a geographic area, the topographic data comprising a plurality of features having one or more attributes associated therewith;
    generating adjacency data for the plurality of features, wherein the adjacency data of a feature comprises information relating to at least one attribute associated with at least one spatially adjacent feature;
    identifying at least one group of features in dependence on the adjacency data, wherein the adjacency data of a feature is encoded based on the attributes associated with the at least one spatially adjacent feature, wherein encoding the adjacency data comprises generating a point location in an n-dimensional attribute space defined by a number, n, of attributes associated with the plurality of features; and
    identifying one or more anomalous features having adjacency data different from the adjacency data of the at least one group based at least in part on the encoded adjacency data, wherein features having a distance in attribute space above a predetermined number of attributes between said features and the at least one group are identified as anomalous.

17. A system comprising:
a processor; and
a computer readable medium storing one or more instruction(s) arranged such that when executed the processor is caused to:
    obtain topographic data relating to a geographic area, the topographic data comprising a plurality of features having one or more attributes associated therewith;
    generate adjacency data for the plurality of features, wherein the adjacency data of a feature comprises information relating to at least one attribute associated with at least one spatially adjacent feature;
    identify at least one group of features in dependence on the adjacency data, wherein the adjacency data of a feature is encoded based on the attributes associated with the at least one spatially adjacent feature, wherein the adjacency data is encoded by generating a point location in an n-dimensional attribute space defined by a number, n, of attributes associated with the plurality of features; and
    identify one or more anomalous features having adjacency data different from the adjacency data of the at least one group based at least in part on the encoded adjacency data, wherein features having a distance in attribute space above a predetermined number of attributes between said features and the at least one group are identified as anomalous.

* * * * *